United States Patent [19]
Ito et al.

[11] Patent Number: 5,121,266
[45] Date of Patent: Jun. 9, 1992

[54] MAGNETIC RECORDING/REPRODUCING APPARATUS

[75] Inventors: Yoichi Ito, Ibaraki; Fumihiko Yamanushi, Tokyo; Atsushi Yoshioka, Kanagawa; Susumu Ohtsuka, Ibaraki, all of Japan

[73] Assignee: Hitachi, Ltd., Tokyo, Japan

[21] Appl. No.: 354,307

[22] Filed: May 19, 1989

[30] Foreign Application Priority Data

May 30, 1988 [JP] Japan ................. 63-130310

[51] Int. Cl.⁵ .............. G11B 5/035; G11B 5/02; H04N 5/78
[52] U.S. Cl. .................. 360/65; 360/27; 360/33.1
[58] Field of Search .......... 360/65, 27, 33.1; 358/310, 330, 335

[56] References Cited
U.S. PATENT DOCUMENTS 4,786,986 11/1988 Yamanushi et al. ........ 360/33.1

Primary Examiner—Aristotelis Psitos
Assistant Examiner—Won Tae C. Kim
Attorney, Agent, or Firm—Antonelli, Terry, Stout & Kraus

[57] ABSTRACT

A reproducing circuit for use in a magnetic recording and reproducing apparatus having a recording circuit operable to record a video luminance signal in either a conventional recording mode or in a High-Band mode has a first automatic gain control circuit for holding a level of a reproduced FM signal at an input thereof constant, a recording mode determination circuit having an input connected to the first automatic gain control circuit and responsive to an output of the first automatic gain control circuit for determining which the first or second recording mode is used to record the FM signal under reproduction, a first equalizer circuit for equalizing the reproduced FM signal suitably for the first recording mode, a second equalizer circuit for equalizing the reproduced FM signal suitably for the second recording mode, a switch circuit for selecting an output of either the first equalizer circuit or the second equalizer circuit according to an output of the recording mode determination circuit, a second automatic gain control circuit for holding an output level of the switch circuit, whereby the recording mode of the signal undergoing reproduction is automatically determined and the characteristics of the reproducing circuit is changed automatically suitably.

11 Claims, 4 Drawing Sheets

MAGNETIC RECORDING/REPRODUCING APPARATUS

BACKGROUND OF THE INVENTION

The present invention relates to a magnetic recording/reproducing apparatus and, particularly, to a magnetic recording/reproducing apparatus whose video signal reproducing circuit portion is capable of automatically detecting a recording mode of a luminance signal undergoing reproduction, and is capable of changing the characteristics thereof so as to make it suitable to reproduce the luminance signal.

In a recent video tape recorder (referred to as a VTR, hereinafter) for home use, a video signal is recorded according to the luminance signal FM modulation/chrominance signal down conversion system. According to the VHS standard, the carrier frequency is frequency-modulated with a luminance signal within a frequency range from 3.4 MHz to 4.4 MHz and the chrominance signal frequency of 3.58 MHz is converted down to 0.629 MHz to avoid the FM frequency range. Then, theses signals are recorded on a magnetic tape. Therefore, the transmission band of the luminance signal is about 3 MHz and so the horizontal resolution is about 240 lines.

In order to improve the image quality, a High-Band recording system or mode has been proposed, in which the carrier frequency of luminance signal is shifted to the higher frequency side, as disclosed in "½ Inches High-Band VTR" Journal of Japan Television Society, May, 1986, pages 36–39.

In reproducing a video signal recorded in the High Band mode using a standard VTR, it is necessary to use a luminance signal processing circuit having characteristics suitable for the High Band mode. In order to make a VTR which is capable of recording and reproducing video signals in both the conventional mode and the High-Band mode, it has been usual to use a luminance signal processing circuit having changeable characteristics and to change the characteristics manually by a user according to the recording mode of the video signal undergoing reproduction.

In the above mentioned prior art in which a user changes manually the characteristics of the luminance signal processing circuit according to the recording mode of the signal undergoing reproduction, a detection of the recording mode is performed by a visual judgement of the user who watches the monitor screen. That is, the switching of the characteristics of the luminance signal processing circuit during reproduction has not been automated as yet.

It may be considered desirable to automate such change of the characteristics of the luminance signal processing circuit by using the difference in the carrier frequency of the luminance signal occurring between the usual mode and the High Band mode. However, there has been no prior art embodying such a scheme. In order to automate the mode switching during reproduction, a circuit construction therefor should not lead to any problem such as errouneous judgement, etc. This has been also not considered as yet.

SUMMARY OF THE INVENTION

An object of the present invention is to provide a VTR which can record and reproduce a video signal in both of the conventional mode and the High-Band mode, including a magnetic reproducing circuit having a chrominance signal processing portion and a luminance signal processing portion which is capable of automatically detecting the recording mode of the video signal under reproduction and of changing its characteristics automatically and stably according to a result of the detection so as to make it suitable for the detected recording mode, without error regardless of operating conditions of the VTR including a tape running system.

The above object is achieved by a provision of a recording mode detecting circuit. The recording mode detecting circuit comprises an FM automatic gain control (FM AGC), a recoding mode detector and a switching means responsive to an output of the FM AGC to change the characteristics of the luminance signal processing portion of the magnetic reproducing circuit. An operation timing of the recording mode detector may be determined according to the reproduced FM signal at an input side of the equalizers of the luminance signal processing portion. Alternatively, a recording mode detecting timing is provided by using a rotational phase signal of the head drum.

In the recording mode detector circuit, by detecting the recording mode by means of the reproduced FM signal before the latter enters into the luminance signal processing portion whose characteristics are changed according to the recording mode of a video signal under reproduction, the lower sideband of the reproduced FM signal can not be erroneously detected as a carrier even when the recording mode is changed from one mode to the other at a start time of reproduction or on the way of the tape running, and thus it becomes possible to reliably detect the recording mode used to record a signal undergoing reproduction. Further, by detecting the recording mode by means of the reproduced FM signal after it has passed through the FMAGC circuit, it is possible to detect the recording mode reliably, regardless of variations in the reproducing levels of the tape and the head. Further, with this FMAGC circuit provided separately from an FMAGC circuit included in the luminance signal processing portion for stabilizing the operation of a drop-out detection (D.O.DET) circuit also included in the luminance signal processing portion, it is possible to provide a test point for a reproduced FM signal in a preceding stage of the latter FMAGC circuit and thus a regulation of the tape running system becomes easier. Further, on demand, by timing the detection by using the rotational phase signal of the head drum, etc., the detection becomes reliable in a special reproduction, such as searching, etc.

DETAILED DESCRIPTION OF THE PREFERRED EMBODIMENTS

An embodiment of the present invention will be described with reference to FIGS. 1 to 5 after the background is described in more detail with reference to FIGS. 6 and 7.

Figure 6A:
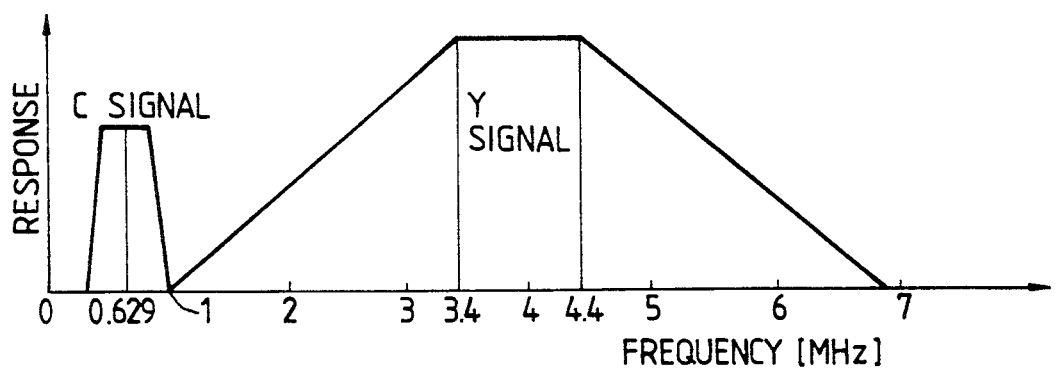
FIGS. 6A and 6B are graphs showing frequency allocations in a conventional recording system and the High-Band system for a VTR of VHS system, respectively.
Figure 6B:
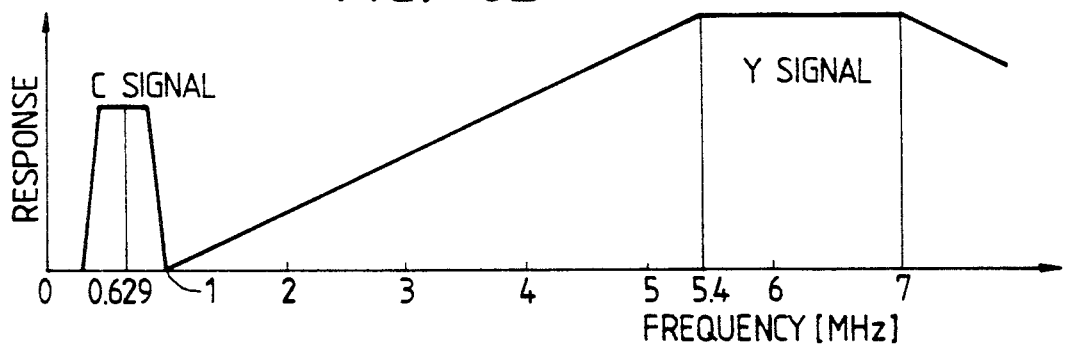

FIG. 6A illustrates a frequency allocation of a video signal to be recorded on a magnetic tape in the conventional VHS recording system (first recording mode) in which a carrier is frequency-modulated with a luminance signal (Y signal) in a frequency range of 3.4–4.4 MHz and a sub-carrier of a chrominance signal (C signal) is frequency-converted from 3.58 MHz down to 0.629 MHz. The frequency band of the Y signal is about 3 MHz. In the VHS system, recording/reproducing under the High-Band standard is also usable in which the carrier frequency of the Y signal is set to 5.4–7.0 MHz as shown in FIG. 6B, and where the C signal is converted down to a lower range in the same way as performed in the conventional recording system. With this High-Band system, the frequency band of the Y signal is broadened by about 2 MHz which corresponds to an improvement of resolution by about 160 lines.

Figure 7:
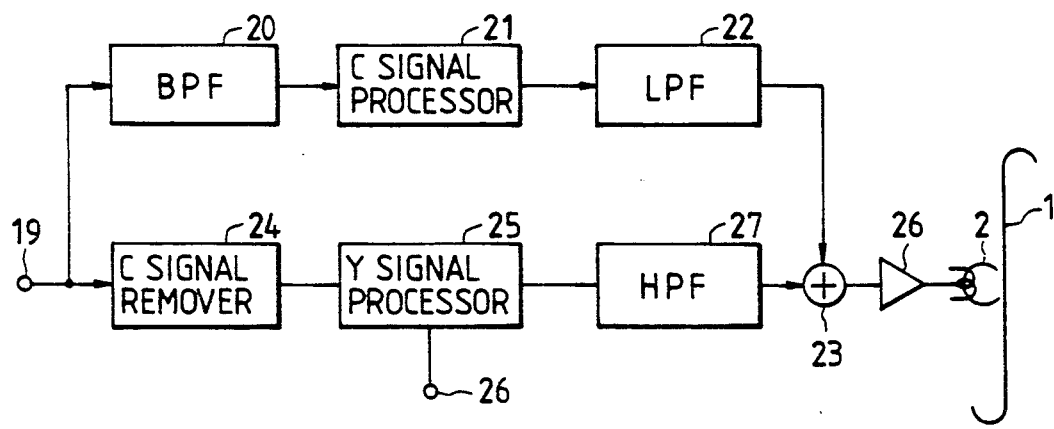
FIG. 7 is a block diagram showing an example of a conventional recording system.

FIG. 7 is a block diagram showing an example of the construction of a recording system of a conventional magnetic recording/reproducing apparatus. In FIG. 7, a composite signal inputted to a terminal 19 is derived by a band-pass-filter (BPF) 20 and the frequency band thereof is converted by a recording C signal processing circuit 21 into a lower frequency band. Then, after high frequency components of the C signal are removed by a low-pass-filter (LPF) 22, the C signal is supplied to an adder 23. The input signal from the terminal 19 is also supplied to a C signal removing circuit 24 to derive only a Y signal which is frequency-modulated in a recording Y signal processing circuit 25. Then, a frequency component thereof which overlap with the low frequency converted C signal is removed by a high-pass-filter (HPF) 27 and, then, is supplied to the adder 23, in which the Y signal and the C signal are frequency-multiplexed. Then, the video signal is recorded on the magnetic tape 1 through a head 2. A total characteristic of a LPF, a pre-emphasis circuit and an FM modulation circuit, etc., to be included in the recording Y signal processing circuit 25 is switched between that suitable to the conventional system and the High Band system in response to a signal supplied to a terminal 26 from a recording mode selection switch which can be switched arbitrarily by a user manually.

Figure 1:
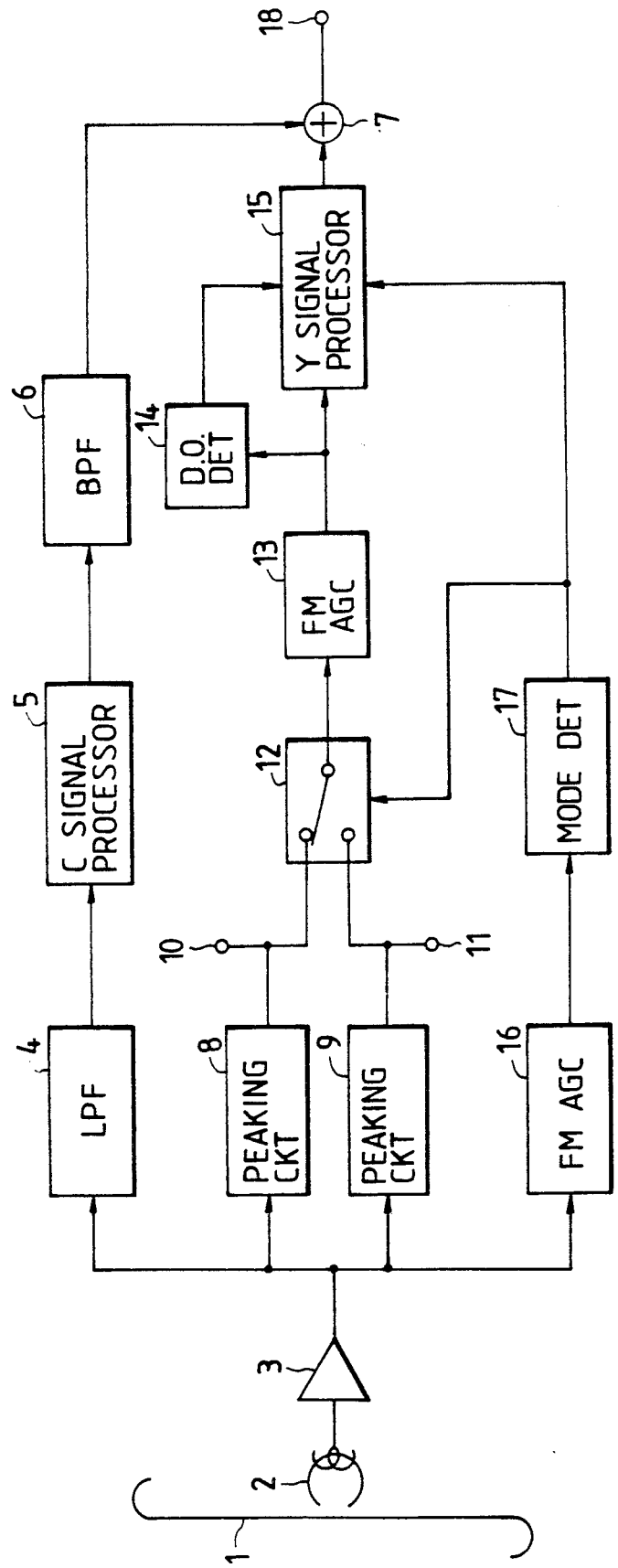
FIG. 1 is a block diagram showing an embodiment of a reproduction system of a magnetic recording/reproducing device according to the present invention.

FIG. 1 is a block diagram showing an embodiment of the present invention, which is a reproduction system for reproducing a signal recorded on a magnetic tape by the circuit shown in FIG. 7. In FIG. 1, a reference numeral 1 depicts a magnetic tape, 2 identifies a reproduction head, 3 identifies a preamplifier, 4 a LPF, 5 a reproducing C signal processing circuit, 6 identifies a BPF, 7 identifies an adder, 8 and 9 identify equalizers in the form of peaking circuits, 10 and 11 identify test terminals, 12 identifies a switch circuit, 13 and 16 identify FMAGC circuits, 14 identifies a D.O. DET circuit, 15 identifies a reproduction Y signal processing circuit, 17 identifies a recording mode detector, and 18 an output terminal.

In FIG. 1, a signal readout from the magnetic tape 1 by the reproduction head 2 is amplified by the preamplifier 3 and supplied to the LPF4, the peaking circuit 8 for the conventional recording mode, the peaking circuit 9 for the High-Band recording mode and the FMAGC circuit 16, respectively. First, in the LPF 4, only a C signal component is derived and a subcarrier frequency thereof is recovered to 3.58 MHz. After undesired frequency components thereof are removed by the BPF6, it is supplied to the adder 7.

Figure 2:
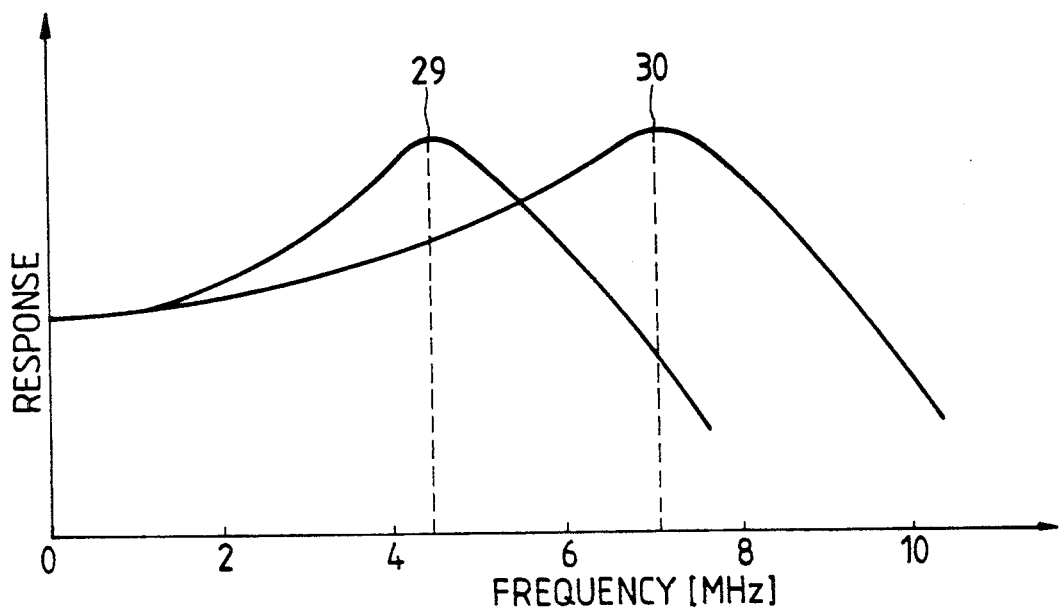
FIG. 2 is a graph showing characteristics of peaking circuits of a conventional system and a high band system.

FIG. 2 shows characteristics of the peaking circuits in FIG. 1, in which 29 shows the characteristic of the peaking circuit 8 and 30 shows that of the peaking circuit 9.

The switch circuit 12 for switching between outputs of the peaking circuits 8 and 9 responds to an output of the mode detector 17 to be described later to pass either the output of the peaking circuit 8 having such frequency characteristics shown by 29 in FIG. 2 when the signal under reproduction is recorded by the conventional recording system (first recording mode) or the output of the peaking circuit 9 having such frequency characteristics as shown by 30 in FIG. 2 for the High-Band system recording (second recording mode). Then, the signal passed through the switch circuit 12 is supplied through the FMAGC circuit 13 and the reproducing signal processing circuit 15 to the adder 7, frequency-multiplexed with the previously mentioned C signal therein and, then, outputted from the terminal 18 as an original NTSC signal. A total characteristic of an FM demodulated circuit, a deemphasis circuit, etc., constituting the reproduction Y signal processing circuit 15 is also switched by the output of the mode detector 17, according to the recording mode of the signal undergoing reproduction.

The mode detector 17 determines the recording mode of the reproduced signal, a result of which is supplied to the switch 12 and the reproduced Y signal processing circuit 15 so that the characteristic of the signal processing circuit of the reproduction system is automatically switched to one suitable for the detected recording mode.

In order to detect the recording mode, a reproduced signal at an input of the peaking circuit should be used. That is, the peaking circuits 8 and 9 function as FM equalizers for compensating for transmission characteristics of low frequency emphasis and high frequency suppression which are caused in the tape head system. Further, as shown in FIG. 2, the FM equalizers have characteristics by which frequencies around maximum frequency of FM carrier are emphasized and a lower side band is suppressed. Therefore, in this embodiment, the center peaking frequency of the peaking circuit 9 is shifted to the high frequency side by about 2 MHz, compared with that of the peaking circuit 8. If such signal as the input signal of the reproduced Y signal processing circuit 15 which is an output of the peaking circuit were used to detect the recording mode with the switch 12 at a start of the reproduction being positioned as shown in FIG. 1 so that the signal recorded in the High Band mode is reproduced, the mode detector 15 would detect a lower sideband as a carrier and judge the reproduced signal as having been recorded in the conventional mode, because the lower side band component of the input signal of the reproduced Y signal processing circuit 15, which is separated from the carrier by about 2 MHz, could be abnormally emphasized with respect to the carrier.

A similar phenomenon would occur in a case where the recording mode of a signal undergoing reproduction is switched from the conventional mode to the High Band mode at any point along the tape. In order to prevent such erroneous operation of the mode detector, the reproduced signal at the input of the peaking circuit is used to judge the recording system, as shown in FIG. 1.

With this circuit construction, it become possible to reliably detect the recording mode of a signal undergoing reproduction regardless of the operating conditions of the peaking circuits 8 and 9 and the reproduced Y signal processing circuit 15 in the reproducing portion.

Further, in the reproducing portion, the output of the FMAGC circuit 16 is used as the input signal to the mode detector 17. That is, a signal readout by the head 2 is supplied to the LPF4 and the peaking circuits 8 and 9 after being amplified by the preamplifier 3 and to the mode detector 17 after the amplitude of the amplified signal is made constant by the FMAGC circuit 16. Therefore, the amplitude of the input to the mode detector 17 is constant even if the amplitude of the reproduced signal is changed by a change of sensitivity of the tape and the head and thus it is possible to perform a reliable detection.

The FMAGC circuit 16 is provided separately from the FMAGC circuit 13 for stabilizing an operation of the D.O.DET circuit 14. In this regard, it is assumed that the FMAGC circuit 13 is removed and an output of the FMAGC circuit 16 used as inputs of the peaking circuits 8 and 9. In such case, when it is desired to regulate the tape running system by means of signals at the reproduced signal test terminals 10 and 11, it is impossible to do so because the signal level is always constant due to the fact that the signal gain after being peaked is controlled by the FMAGC circuit 16. Further, in this case, the S/N ratio of the reproduced signal is degraded even if the test terminals are repositioned in an input portion of the FMAGC 16 and, therefore, it is also inadequate for regulation.

On the contrary, it is assumed that the FMAGC circuit 16 is removed and an output signal of the FMAGC circuit 13 is used as the input signal of the mode detector 17. This construction may be adequate for regulation of the running system at the test terminals 10 and 11. However, since there is a possibility of erroneous judgement in this construction as mentioned previously, it is also inadequate.

By providing both of the FMAGC circuits 13 and 16 separately as shown in FIG. 1, adequate regulation of the running system at the test terminals 10 and 11 as well as errorless judgement is made possible.

Specific examples of the mode detector 17 will be described with reference to FIGS. 3 to 5.

Figure 3:
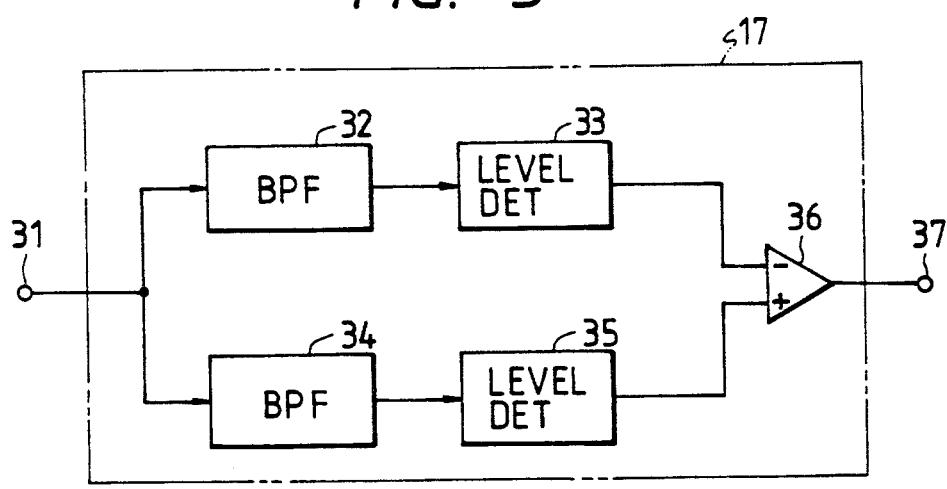
FIGS. 3, 4 and 5 are block diagrams showing concrete examples of a recording mode detector of the present invention.

FIG. 3 is a block diagram showing an embodiment of the mode detector 17, in which 31 depicts a reproduced signal input terminal, 32 identifies a BPF for the conventional mode (first recording mode), 33 identifies a signal level detector for the conventional mode, 34 identifies a BPF for the High Band mode (second recording mode), 35 identifies a signal level detector for the High Band mode, 36 identifies a comparator and 37 identifies a mode detection signal output terminal.

In FIG. 3, a reproduced signal is inputted to the terminal 31 and supplied to the BPF's 32 and 34. These BPF's operate to derive a portion of a FM luminance signal around the carrier wave.

Outputs of the BPF's 32 and 34 are sent to the level detectors 33 and 35, respectively. In the level detectors 33 and 35, detection voltages proportional to levels of the signals passed through the BPF's 32 and 34 are produced.

The output of the level detectors 33 and 35 are supplied to the comparator 36 which provides, at its output terminal 37, a high level signal when the reproduced signal is recorded in the High Band mode or a low level signal when the recording mode of the reproduced signal is the conventional mode. The output of the comparator 36 is the output of the mode detector 17, which is supplied to the switch 12 and the reproduced Y signal processing circuit 15 shown in FIG. 1.

Figure 4:
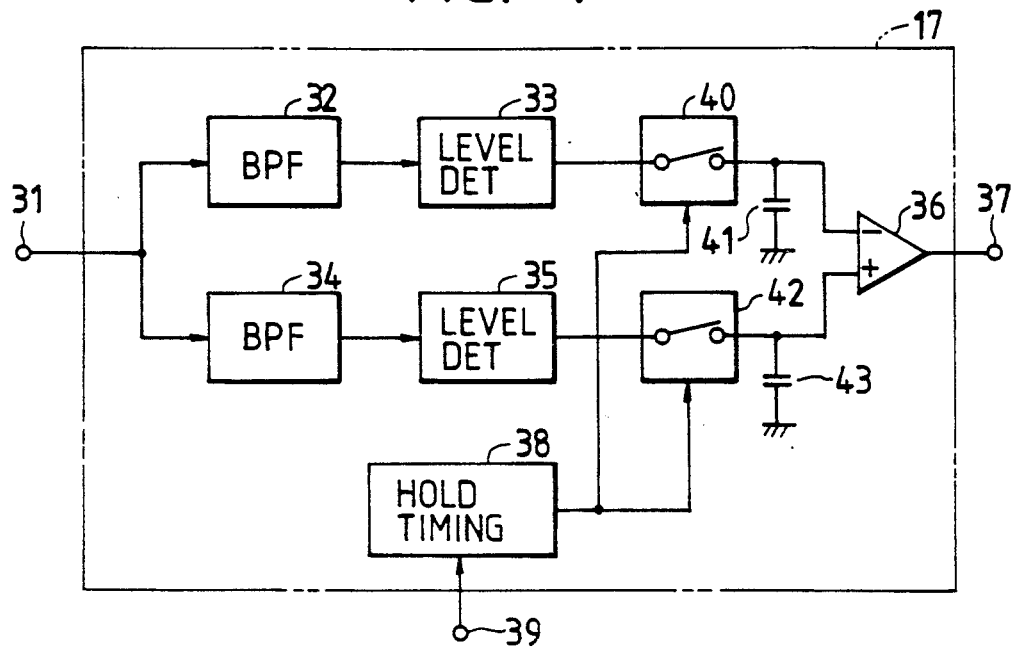

Then, another example of the mode detector is shown in FIG. 4 in which 38 depicts a hold timing circuit, 39 identifies a head drum rotation phase signal input terminal, 40 and 42 designate switches, 1 and 43 identify a capacitor, and the same reference numerals as those used in FIG. 3 identify corresponding portions, respectively.

In FIG. 4, the hold timing circuit 38 responds to a head drum rotation phase signal (referred to as SW 30 signal) from the terminal 39 or a horizontal or vertical synchronizing signal to produce a control signal for maintaining the switches 40 and 42 in an on state only during a vertical or horizontal synchronizing period. Upon this, output voltages of the level detectors 33 and 35 during the vertical or horizontal synchronizing period are produced in the capacitors 41 and 43 connected to the switches 40 and 42, respectively. Therefore, it becomes possible to perform a stable judgement without influence of the video content of the video signal.

In a case where a tape having information recorded in the guard band system is to be searched (high speed reproduction), the hold timing circuit 38 produces, on the basis of the SW 30 signal, a control signal which causes the switches 40 and 42 to be turned off during a period corresponding to a noise band within one video field. Upon this, a malfunction (chattering, etc.) of the mode detector in the noise band period during searching is prevented.

Figure 5:
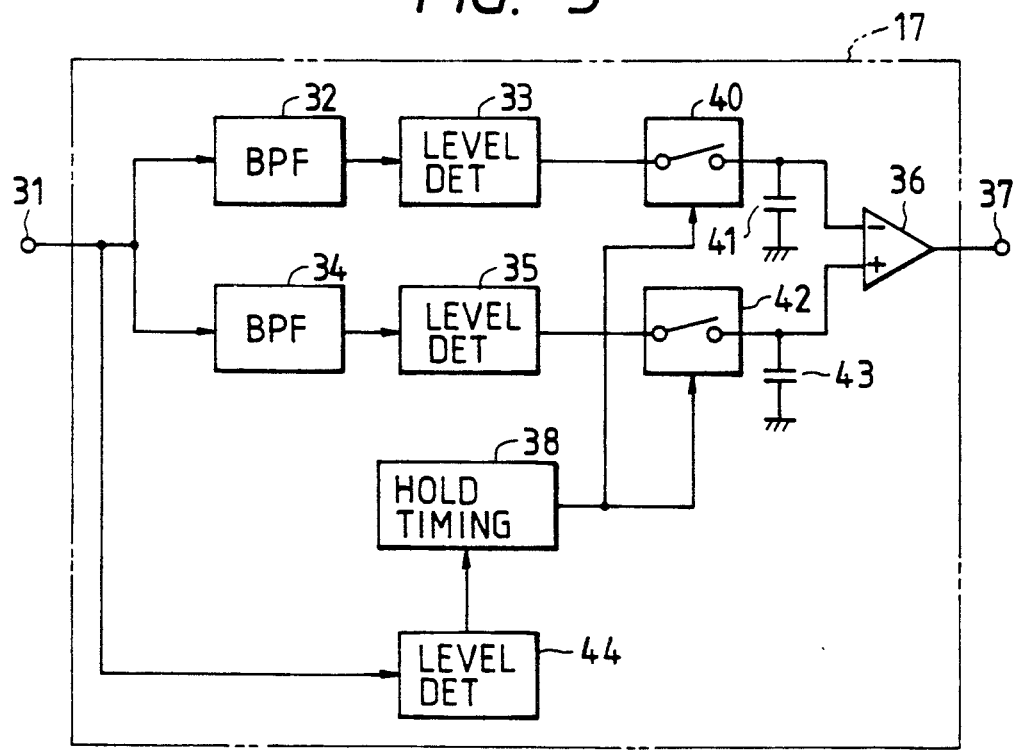

Such malfunction of the mode detector in the noise band period during searching may also be prevented in an embodiment shown in FIG. 5.

FIG. 5 is a block diagram showing another concrete example of the mode detector 17, in which 44 depicts a level detector, and the same reference numerals as those used in FIG. 4 depict corresponding portions, respectively.

In FIG. 5, the amplitude of a reproduced signal inputted from a terminal 31 is alternated around a noise level in noise band period during searching. In the level detector 44, a detection voltage proportional to the amplitude of this reproduced signal is produced and, in the hold timing circuit 38, a noise band period is detected on the basis of this detection voltage to produce a control signal for maintaining the switches 40 and 42 in an off state during the noise band period. Thus, since the detection voltages of the level detectors 33 and 35 at a time immediately before the noise band period are held in the capacitors 41 and 43, even during the noise band period, respectively, a malfunction of the mode detector can be prevented.

In this embodiment, it is possible to prevent the malfunction of the mode detector even if the noise band period is not fixed in one video field during searching.

As described hereinbefore, according to the present invention, when a signal recorded by the conventional mode or the High Band mode is reproduced in a VHS VTR, the recording mode used is automatically detected by using the reproduced FM signal at the input of the luminance signal processing circuit having characteristics switchable according to the used recording mode. Therefore, it is possible to reliably and automatically determine the recording system being used without influence of characteristics, etc., of circuits at a start of reproduction, etc.

Further, it is possible to perform a reliable judging regardless of a variation of a reproduction signal level of the tape and head, by using a reproduced FM signal after it has passed through the FMAGC circuit. Further, with the separate provision of the FMAGC circuit upstream of the mode detector and the FMAGC circuit upstream of the D.O.DET circuit, a regulation of the running system becomes possible with a good S/N of the signal in a stage after the peaking circuit. Further, by timing the mode detection on the basis of the SW 30 signal, etc., it is possible to provide a magnetic recording/reproducing device having preferable functions in which it is possible to stabilize the mode detection during a special reproduction.

What is claimed is:

1. A reproducing circuit for reproducing a video signal picked-up from a magnetic tape, said video signal having been recorded on said magnetic tape in one of first and second recording modes in which a luminance signal of the video signal is converted into an FM luminance signal having a first carrier frequency in said first recording mode and a second carrier frequency in said second recording mode, said reproducing circuit comprising:
   a first automatic gain control circuit connected to receive an input video signal picked-up from a magnetic tape;
   a recording mode detection circuit connected to receive an output from said first automatic gain control circuit for determining whether said input video signal was recorded on said magnetic tape in the first or second modes and for producing a mode selection signal;
   a first equalizer circuit connected to receive said input video signal picked-up from said magnetic tape for equalizing said input video signal for said first recording model;
   a second equalizer circuit connected to receive said input video signal picked-up from said magnetic tape for equalizing said input video signal for said second recording model;
   a switch circuit responsive to said mode selection signal and having respective inputs connected to the first and second equalizer circuit for selecting an output from said first equalizer circuit or said second equalizer circuit; and
   a second automatic gain control circuit connected to receive an output of one of the first and second equalizer circuits so that the waveform of the outputs of said first and second equalizer circuits if unaffected by said second automatic gain control circuit.

2. The reproducing circuit as claimed in claim 1, wherein said recording mode detection circuit comprises a first band-pass-filter, a first level detector connected in series with said first band-pass-filter, a second band-pass-filter, a second level detector connected in series with said second band-pass-filter and a comparator having inputs connected to outputs of said level detectors.

3. The reproducing circuit as claimed in claim 2, said recording mode detection circuit further comprising a first switch means provided between said output of said first level detector and said comparator, a second switch means provided between said output of said second level detector and said comparator and a hold timing circuit responsive to an external control signal to hold either of said first switch means or said second switch means open for the horizontal synchronizing period or a vertical synchronizing period.

4. The reproducing circuit as claimed in claim 3, wherein said external control signal is a rotational phase signal produced by rotation of a head drum and a timing of operation of said recording mode determination circuit for determining the recording mode of a reproduced signal is set at a particular position in one video field on the basis of a rotational phase of a rotary head drum.

5. The reproducing circuit as claimed in claim 3, wherein said external control signal is a horizontal synchronizing signal.

6. The reproducing circuit as claimed in claim 3, wherein said external control signal is a vertical synchronizing signal.

7. The reproducing circuit as claimed in claim 3, said recording mode detection circuit further comprising a third level detector for detecting a level of a reproduced signal, wherein said hold timing circuit responds to an output of said third level detector.

8. The reproducing circuit claimed in claim 1, wherein said first and said second equalizer circuits comprise peaking circuits, respectively.

9. A reproducing circuit according to claim 1, further comprising a test terminal connected between the output of at least one of the first and second equalizer circuits and said second automatic gain control circuit.

10. A reproducing circuit according to claim 1, wherein a respective test terminal is connected to the output of said first equalizer circuit and said second equalizer circuit.

11. A reproducing circuit according to claim 1, wherein said second automatic gain control circuit is connected to the output of said switch circuit.

* * * * *